United States Patent
Horikawa

(10) Patent No.: US 12,344,055 B2
(45) Date of Patent: Jul. 1, 2025

(54) TOWED VEHICLE CONNECTION DETERMINATION SYSTEM

(71) Applicant: TOYOTA JIDOSHA KABUSHIKI KAISHA, Toyota (JP)

(72) Inventor: Naoki Horikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 18/131,957

(22) Filed: Apr. 7, 2023

(65) Prior Publication Data
US 2023/0415528 A1 Dec. 28, 2023

(30) Foreign Application Priority Data
Jun. 27, 2022 (JP) ................... 2022-102630

(51) Int. Cl.
*B60D 1/24* (2006.01)
(52) U.S. Cl.
CPC .................... *B60D 1/248* (2013.01)
(58) Field of Classification Search
CPC ................ B60D 1/248; B60D 1/62
See application file for complete search history.

(56) References Cited

U.S. PATENT DOCUMENTS

| | | | | |
|---|---|---|---|---|
| 9,956,965 | B1* | 5/2018 | Hall | B60W 10/22 |
| 2006/0287798 | A1* | 12/2006 | Inoue | B60W 10/10 |
| | | | | 701/70 |
| 2013/0138288 | A1* | 5/2013 | Nickolaou | B60W 40/13 |
| | | | | 701/99 |
| 2019/0039595 | A1* | 2/2019 | Hawley | B60L 15/2018 |
| 2020/0114896 | A1* | 4/2020 | Kennedy | B60T 13/263 |
| 2023/0159044 | A1* | 5/2023 | Slattery | B60W 50/082 |
| | | | | 701/99 |
| 2023/0170652 | A1* | 6/2023 | Khamis | B60D 1/62 |
| 2024/0278763 | A1* | 8/2024 | Jundt | B60T 17/22 |
| 2025/0026161 | A1* | 1/2025 | Ricke | B60D 1/015 |

FOREIGN PATENT DOCUMENTS

| | | |
|---|---|---|
| JP | 2005-001548 A | 1/2005 |
| JP | 2009-057003 A | 3/2009 |
| JP | 2012-046064 A | 3/2012 |

* cited by examiner

*Primary Examiner* — Sze-Hon Kong
(74) *Attorney, Agent, or Firm* — Dinsmore & Shohl LLP

(57) ABSTRACT

The towed vehicle connection determination system includes a towed vehicle presence determination unit that determines whether or not the towed vehicle is connected, based on at least two or more pieces of information among the weight estimation equipment, the peripheral condition detection equipment, and the vehicle rear monitoring equipment. Therefore, it is possible to improve the accuracy of determining whether or not the towed vehicle is connected as compared with the case of determining whether or not the towed vehicle is connected based on only one piece of information such as the weight estimation value and the captured image of the camera.

5 Claims, 2 Drawing Sheets

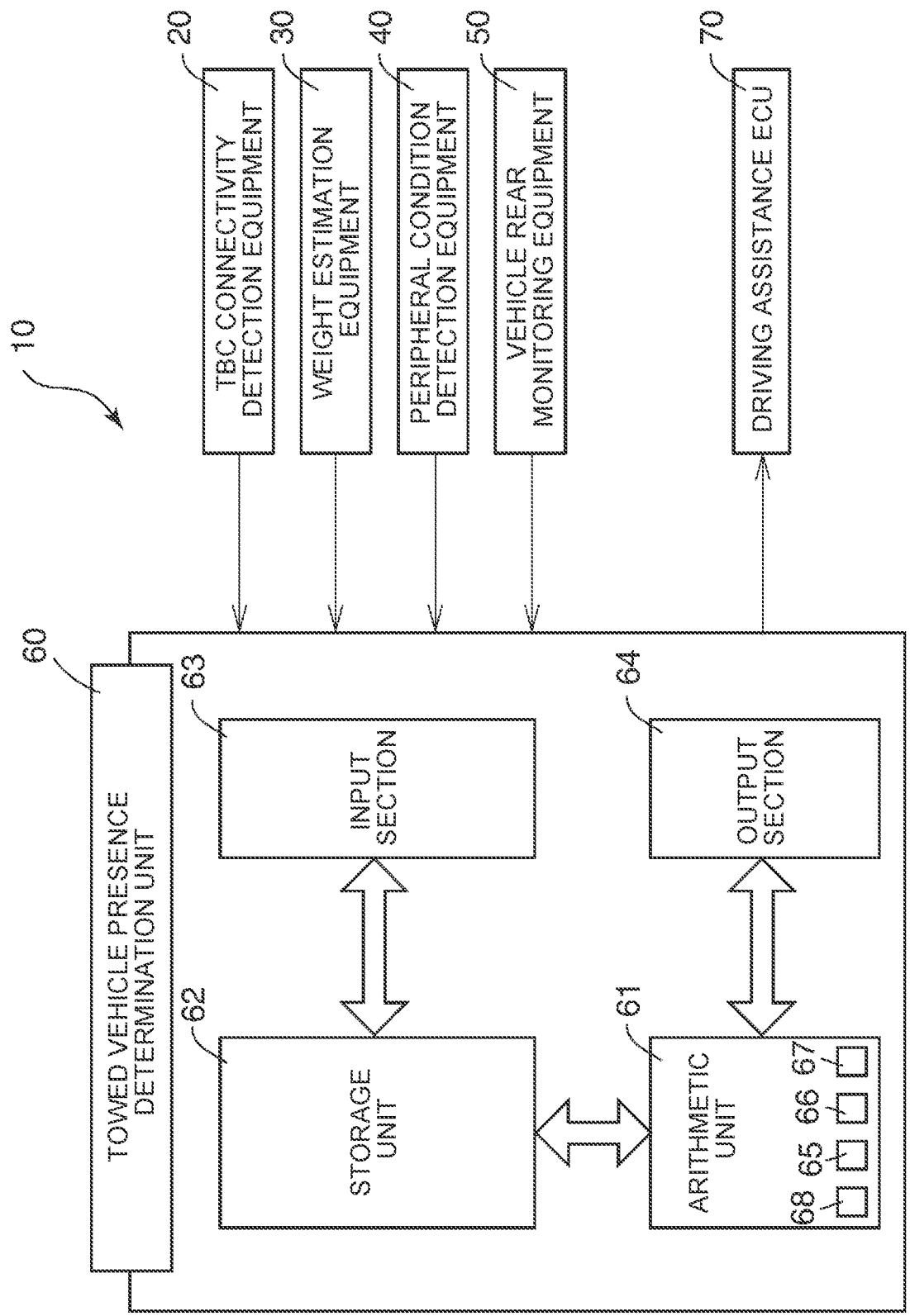

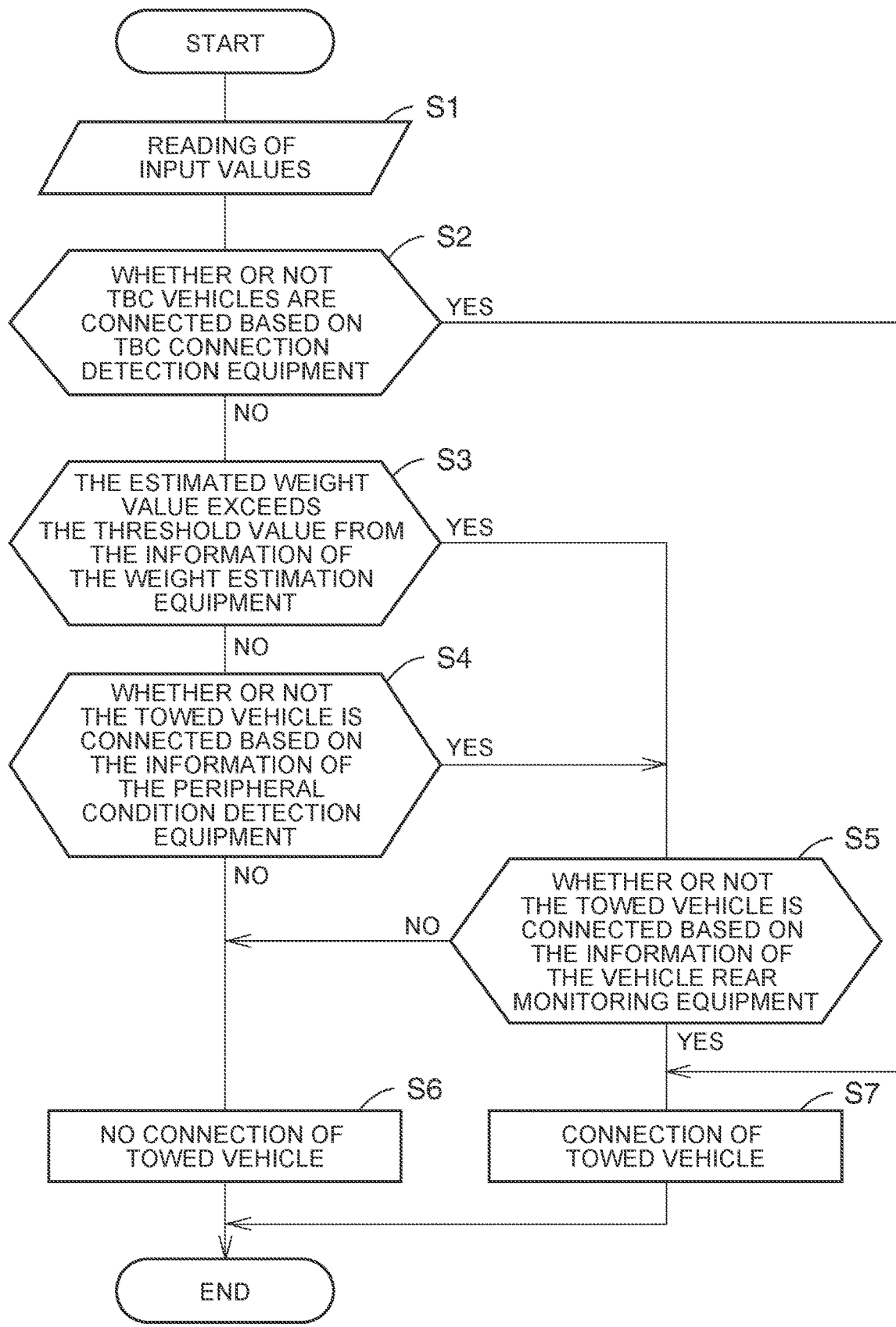

TOWED VEHICLE CONNECTION DETERMINATION SYSTEM

CROSS-REFERENCE TO RELATED APPLICATION

This application claims priority to Japanese Patent Application No. 2022-102630 filed on Jun. 27, 2022, incorporated herein by reference in its entirety.

BACKGROUND

1. Technical Field

The present disclosure relates to a towed vehicle connection determination system that determines whether a towed vehicle (trailer) is connected to a towing vehicle (tractor or own vehicle).

2. Description of Related Art

In North America, towing of towed vehicles is a common use, and there are a wide variety of towed vehicles. In the case of a towed vehicle capable of being electrically braked (trailer brake control (TBC)) (hereinafter referred to as a TBC compatible vehicle), it is possible to automatically detect that the towed vehicle is connected based on whether the TBC is connected. However, the utilization rate of the TBC compatible vehicles is about 50%. TBC non-compatible vehicles, which account for approximately half of the towed vehicles, such as small towed vehicles without brakes for uses such as boat towing, or towed vehicles equipped with surge brakes, cannot automatically detect that the towed vehicle is connected. Therefore, it is conceivable to determine whether the towed vehicle is connected from the total weight estimation value including the towing vehicle and the towed vehicle.

However, the estimation accuracy of the weight estimation value fluctuates due to disturbances such as the loading condition, the number of occupants, and the road surface gradient. Therefore, it is difficult to improve the determination accuracy in determining whether the towed vehicle is connected based on only the weight estimation value.

Japanese Unexamined Patent Application Publication No. 2009-57003 (JP 2009-57003 A) discloses a technique for determining whether a towed vehicle is connected regardless of a weight estimation value. In the technique disclosed in the publication, whether the towed vehicle is connected is determined based on an image of the rear of the vehicle captured by an in-vehicle camera.

However, in the technique disclosed in the above publication, since whether the towed vehicle is connected is determined based on only the captured image of the camera, there is room for improvement in improving the determination accuracy in determining whether the towed vehicle is connected.

SUMMARY

An object of the present disclosure is to provide a towed vehicle connection determination system capable of improving the determination accuracy in determining whether a towed vehicle is connected as compared with the related art.

The present disclosure that achieves the above object is as follows.

(1) A towed vehicle connection determination system includes: weight estimation equipment; peripheral condition detection equipment; vehicle rear monitoring equipment; and a towed vehicle presence determination unit for determining whether a towed vehicle is connected from at least two or more pieces of information of the weight estimation equipment, the peripheral condition detection equipment, and the vehicle rear monitoring equipment.

(2) In the towed vehicle connection determination system according to (1), the towed vehicle presence determination unit includes: a first determination unit that determines whether a total weight estimation value including the towed vehicle and a towing vehicle exceeds a threshold value based on information from the weight estimation equipment; a second determination unit that estimates whether there is the towed vehicle based on information from the peripheral condition detection equipment; and a third determination unit that determines whether there is the towed vehicle based on information from the vehicle rear monitoring equipment.

(3) In the towed vehicle connection determination system according to (2), the towed vehicle presence determination unit determines that there is a connection of the towed vehicle when either one of a condition that the first determination unit determines that the total weight estimation value exceeds the threshold value and a condition that the second determination unit estimates that there is the towed vehicle is satisfied, and when the third determination unit determines that there is the towed vehicle.

(4) In the towed vehicle connection determination system according to (2), the towed vehicle presence determination unit determines that there is no connection of the towed vehicle when the third determination unit determines that there is no towed vehicle, even when either one of a condition that the first determination unit determines that the total weight estimation value exceeds the threshold value and a condition that the second determination unit estimates that there is the towed vehicle is satisfied.

(5) The towed vehicle connection determination system according to (2) further includes TBC connection detection equipment. The towed vehicle presence determination unit further includes a pre-determination unit that determines whether there is a connection of the towed vehicle based on information from the TBC connection detection equipment, in addition to the first determination unit to the third determination unit. The towed vehicle presence determination unit determines that there is the connection of the towed vehicle when either one of a condition that the first determination unit determines that the total weight estimation value exceeds the threshold value and a condition that the second determination unit estimates that there is the towed vehicle is satisfied, and when the third determination unit determines that there is the towed vehicle, even when the pre-determination unit determines that there is no connection of the towed vehicle.

(6) The towed vehicle connection determination system according to (2) further includes TBC connection detection equipment. The towed vehicle presence determination unit further includes a pre-determination unit that determines whether there is a connection of the towed vehicle based on information from the TBC connection detection equipment, in addition to the first determination unit to the third determination unit. The towed vehicle presence determination unit determines that there is no connection of the towed vehicle when the pre-determination unit determines that there is no connection of the towed vehicle and when the third determination unit determines that there is no towed vehicle, even when either one of a condition that the first determination unit determines that the total weight estimation value exceeds the threshold value and a condition that the second determination unit estimates that there is the towed vehicle is satisfied.

The towed vehicle connection determination system according to the above (1) includes a towed vehicle presence determination unit for determining whether there is a connection of a towed vehicle from at least two or more pieces of information of the weight estimation equipment, the peripheral condition detection equipment, and the vehicle rear monitoring equipment. Therefore, according to the towed vehicle connection determination system of the above (1), it is possible to improve the determination accuracy in determining whether the towed vehicle is connected as compared with the case of determining whether the towed vehicle is connected based on only one piece of information such as the weight estimation value and the captured image of the camera.

In the towed vehicle connection determination system of the above (2), the towed vehicle presence determination unit includes first to third determination units. Therefore, according to the towed vehicle connection determination system of the above (2), (a) it can be determined whether the total weight estimation value including the towed vehicle and the towing vehicle exceeds the threshold value based on the information from the weight estimation equipment. (b) It can be estimated whether there is the towed vehicle based on information from the peripheral condition detection equipment. (c) It can be determined whether there is the towed vehicle based on information from the vehicle rear monitoring equipment.

In the towed vehicle connection determination system of the above (3), the towed vehicle presence determination unit determines that there is a connection of the towed vehicle when either one of a condition that the first determination unit determines that the total weight estimation value exceeds the threshold value and a condition that the second determination unit estimates that there is the towed vehicle is satisfied, and when the third determination unit determines that there is the towed vehicle. Therefore, according to the towed vehicle connection determination system of the above (3), it is possible to determine whether the towed vehicle is connected from two or more pieces of information, and it is possible to improve the determination accuracy in determining whether the towed vehicle is connected.

In the towed vehicle connection determination system of the above (4), the towed vehicle presence determination unit determines that there is no connection of the towed vehicle when the third determination unit determines that there is no towed vehicle, even when either one of a condition that the first determination unit determines that the total weight estimation value exceeds the threshold value and a condition that the second determination unit estimates that there is the towed vehicle is satisfied. Therefore, according to the towed vehicle connection determination system of the above (4), it is possible to determine whether the towed vehicle is connected from two or more pieces of information, and it is possible to improve the determination accuracy in determining whether the towed vehicle is connected.

In the towed vehicle connection determination system of the above (5), the towed vehicle presence determination unit determines that there is the connection of the towed vehicle when either one of a condition that the first determination unit determines that the total weight estimation value exceeds the threshold value and a condition that the second determination unit estimates that there is the towed vehicle is satisfied, and when the third determination unit determines that there is the towed vehicle, even when the pre-determination unit determines that there is no connection of the towed vehicle. Therefore, according to the towed vehicle connection determination system of the above (5), it is possible to determine whether the towed vehicle is connected from two or more pieces of information even when the pre-determination unit determines that there is no connection of the towed vehicle, and it is possible to improve the determination accuracy in determining whether the towed vehicle is connected.

In the towed vehicle connection determination system of the above (6), the towed vehicle presence determination unit determines that there is no connection of the towed vehicle when the pre-determination unit determines that there is no connection of the towed vehicle and when the third determination unit determines that there is no towed vehicle, even when either one of a condition that the first determination unit determines that the total weight estimation value exceeds the threshold value and a condition that the second determination unit estimates that there is the towed vehicle is satisfied. Therefore, according to the towed vehicle connection determination system of the above (6), it is possible to determine whether the towed vehicle is connected from two or more pieces of information even when the pre-determination unit determines that there is no connection of the towed vehicle, and it is possible to improve the determination accuracy in determining whether the towed vehicle is connected.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram of a towed vehicle connection determination system according to an embodiment of the present disclosure; and FIG. 2 is a flowchart illustrating an example of a control routine of a towed vehicle presence determination unit in the towed vehicle connection determination system according to the embodiment of the present disclosure.

DETAILED DESCRIPTION OF EMBODIMENTS

Hereinafter, a towed vehicle connection determination system (hereinafter, also simply referred to as a system) 10 according to an embodiment of the present disclosure will be described with reference to the drawings. Note that the system 10 may be referred to as a towed vehicle connection determination device.

As illustrated in FIG. 1, the system 10 includes a TBC connection detection equipment 20, a weight estimation equipment 30, a peripheral condition detection equipment 40, a vehicle rear monitoring equipment 50, and a towed vehicle presence determination unit 60.

TBC connection detection equipment 20 is a device for detecting a connection of Trailer Brake Control (TBC), and includes, for example, a Trailer Brake Control Electronic Control Unit (TBC-ECU). In the case of a towed vehicle that can be electrically braked, it is possible to automatically detect that the towed vehicle is connected to the towed vehicle.

The weight estimation equipment 30 is a device that calculates a total weight estimate including the towed vehicle and the towed vehicle, and includes, for example, an EFI-ECU that performs fuel-injection control of Electronic Fuel Injection (EFI).

The peripheral condition detection equipment 40 is a device for detecting the surrounding condition of the towing vehicle, and includes, for example, a radar for Blind Spot Monitor (BSM) for assisting the backward checking at the time of lane change, a clearance sonar for detecting a distance from the towing vehicle to an obstacle behind the vehicle, and the like. The peripheral condition detection equipment 40 detects the surroundings mainly during traveling.

The vehicle rear monitoring equipment 50 is a device for monitoring the vehicle rear side of the towing vehicle, and includes, for example, a Panoramic View Monitor (PVM) camera, Back Guide Monitor (BGM) camera, and the like capable of capturing an image of the vehicle rear side of the towing vehicle. The vehicle rear monitoring equipment 50 mainly monitors the vehicle while the vehicle is stopped.

The towed vehicle presence determination unit 60 determines whether or not the towed vehicle is connected based on information (electric signals) from TBC connection detection equipment 20, the weight estimation equipment 30, the peripheral condition detection equipment 40, and the vehicle rear monitoring equipment 50.

The towed vehicle presence determination unit 60 is an ECU, and includes a calculation unit (a storage unit 62 having a CPU) 61, ROM, RAM, an input unit (input interface) 63, and an output unit (output interface) 64. Information (electric signals) from TBC connection detection equipment 20, the weight estimation equipment 30, the peripheral condition detection equipment 40, and the vehicle rear monitoring equipment 50 is read into the calculation unit 61 via the input unit 63, and the connection presence or absence of the towed vehicle is determined in accordance with the control program stored in ROM or RAM in the calculation unit 61.

The towed vehicle presence determination unit 60 includes a first determination unit 65 that determines whether or not the total weight estimation value including the towed vehicle and the towed vehicle exceeds a certain threshold value based on information from the weight estimation equipment 30, a second determination unit 66 that estimates the presence/absence of the towed vehicle based on information from the peripheral condition detection equipment 40, and a third determination unit 67 that determines the presence/absence of the towed vehicle based on information from the vehicle rear monitoring equipment 50. The towed vehicle presence determination unit 60 further includes, in addition to the first to third determination units 65, 66, and 67, a pre-determination unit 68 that determines the presence/absence of the connection (TBC connection) of the towed vehicle based on the data from TBC connection detection equipment 20.

FIG. 2 is a flowchart illustrating an example of a control routine of the towed vehicle presence determination unit 60. The control routine illustrated in FIG. 2 is performed at predetermined intervals during the engine ON after the engine of the towing vehicle is turned ON so as to be able to determine in real time.

First, in the step S1, the information (electric signal) from TBC connection detection equipment 20, the weight estimation equipment 30, the peripheral condition detection equipment 40, and the vehicle rear monitoring equipment 50 is read, and the process proceeds to the step S2.

In the step S2, the presence or absence of the connection of the towed vehicles is determined by the pre-determination unit 68 based on the data from TBC connection detection equipment 20. If there is a connection, the process proceeds to step S7, and it is determined that there is a connection of the towed vehicles. Driving assistance ECU requiring switching or the like depending on whether or not towed vehicles are connected (see FIG. 1). This is signaled to ECU)70 such as automated braking systems for collision-avoidance or collision-load mitigation, or running systems running at constant speeds, and the process proceeds to the end steps.

On the other hand, if it is determined in step S2 that the towed vehicles are not connected, the process proceeds to step S3. In the step S3, based on the information from the weight estimation equipment 30, the first determination unit 65 determines whether or not the total weight estimation of the towed vehicle and the towed vehicle exceeds a certain threshold. If it is determined in step S3 that the total weight-estimated value of the towed vehicle and the towed vehicle exceeds the threshold value, the process proceeds to step S5 described later. On the other hand, if it is determined in the step S3 that the estimated total weights of the towed vehicle and the towed vehicle do not exceed the thresholds, the process proceeds to step S4.

In the step S4, the second determination unit 66 estimates the presence or absence of the towed vehicles based on the information from the peripheral condition detection equipment 40. Then, if it is estimated that there are towed vehicles in the step S4, the process proceeds to step S5 described later. On the other hand, when it is estimated that there are no towed vehicles in the step S4, the process proceeds to the step S6. It is determined that the towed vehicle is not connected, and the driving assistance system ECU 70 is signaled to that effect, and the process proceeds to end step.

If it is determined in the step S3 that the estimated total weights of the towed vehicle and the towed vehicle exceed the threshold value, or if it is estimated in the step S4 that there is a towed vehicle, the process proceeds to step S5. In the step S5, the third determination unit 67 determines the presence or absence of the towed vehicle based on the data from the vehicle rear monitoring equipment 50. Specifically, based on the information from the vehicle rear monitoring equipment 50, it is determined whether or not there is a towed vehicle in the imaging result (the angle of view of the camera) (whether or not it is visible), it is determined that there is a towed vehicle when there is a towed vehicle, and it is determined that there is no towed vehicle when there is no towed vehicle.

If it is determined in step S5 that there is a towed vehicle, the process proceeds to step S7. It is determined that the towed vehicle is connected, and the driving assistance system ECU 70 is signaled to that effect, and the process proceeds to end step. On the other hand, if it is determined in step S5 that there are no towed vehicles, the process proceeds to step S6. It is determined that the towed vehicle is not connected, and the driving assistance system ECU 70 is signaled to that effect, and the process proceeds to end step.

Next, the operation and effects of the embodiment of the present disclosure will be described.

(A) The system 10 includes a towed vehicle presence determination unit 60 that determines whether or not a towed vehicle is connected from at least two or more pieces of information among the weight estimation equipment 30, the peripheral condition detection equipment 40, and the vehicle rear monitoring equipment 50. Therefore, it is possible to improve the accuracy of determining whether or not the towed vehicle is connected as compared with a case where whether or not the towed vehicle is connected is determined based on only one piece of information such as a weight estimation value or a captured image of the camera.

(B) The towed vehicle presence determination unit 60 includes first to third determination units 65 to 67. Therefore, it can be determined whether or not the total weight estimation value including the towed vehicle and the towed vehicle exceeds a threshold value based on information from the weight estimation equipment 30, (b) the presence or absence of the towed vehicle can be estimated based on information from the peripheral condition detection equipment 40, and (c) the presence or absence of the towed vehicle can be determined based on information from the vehicle rear monitoring equipment 50.

(C) When one of the first determination unit 65 determines that the total weight estimation value exceeds the threshold value and the second determination unit 66 estimates that there is a towed vehicle is satisfied and the third determination unit 67 determines that there is a towed vehicle, the towed vehicle presence determination unit 60 determines that there is a connection of the towed vehicle. Therefore, it is possible to determine whether or not the towed vehicle is connected from two or more pieces of information, and it is possible to improve the accuracy of determining whether or not the towed vehicle is connected.

(D) Even if one of the first determination unit 65 determines that the first determination unit 65 exceeds the threshold value and the second determination unit 66 estimates that there is a towed vehicle is satisfied, when the third determination unit 67 determines that there is no towed vehicle, the towed vehicle presence determination unit 60 determines that there is no connection of the towed vehicle. Therefore, it is possible to determine whether or not the towed vehicle is connected from two or more pieces of information, and it is possible to improve the accuracy of determining whether or not the towed vehicle is connected.

(E) Even in a case where the pre-determination unit 68 determines that there is no connection of the towed vehicle, the towed vehicle presence determination unit 60 determines that the first determination unit 65 exceeds the threshold, the second determination unit 66 estimates that there is a towed vehicle, and when the third determination unit 67 determines that there is a towed vehicle, the towed vehicle presence determination unit 60 determines that there is a connection of the towed vehicle. Therefore, even when the pre-determination unit 68 determines that there is no connection of the towed vehicle, it is possible to determine whether or not the towed vehicle is connected from two or more pieces of information, and it is possible to enhance the accuracy of determining whether or not the towed vehicle is connected.

(F) When the towed vehicle presence determination unit 60 determines that the pre-determination unit 68 has no connection of the towed vehicle, it determines that the first determination unit 65 exceeds the threshold value, and the second determination unit 66 estimates that there is a towed vehicle, even if one of them is satisfied, when the third determination unit 67 determines that there is no towed vehicle, it is determined that there is no towed vehicle. Therefore, even when the front determination unit 68 determines that there is no connection of the towed vehicle, it is possible to determine whether or not the towed vehicle is connected from two or more pieces of information, and it is possible to enhance the accuracy of determining whether or not the towed vehicle is connected.

(G) TBC connection detection equipment 20, the weight estimation equipment 30, the peripheral condition detection equipment 40, and the vehicle rear monitoring equipment 50 are devices provided in the vehicle regardless of the presence or absence of the present system 10. Therefore, it is not necessary to newly install the equipment, and an increase in cost can be suppressed.

What is claimed is:

1. A towed vehicle connection determination system comprising:
    weight estimation equipment;
    peripheral condition detection equipment;
    vehicle rear monitoring equipment;
    trailer brake control connection detection equipment; and
    a towed vehicle presence determination unit for determining whether there is a connection of a towed vehicle from at least two or more pieces of information of the weight estimation equipment, the peripheral condition detection equipment, and the vehicle rear monitoring equipment, the towed vehicle presence determination unit including:
        a first determination unit that determines whether a total weight estimation value including the towed vehicle and a towing vehicle exceeds a threshold value based on information from the weight estimation equipment;
        a second determination unit that estimates whether there is the towed vehicle based on information from the peripheral condition detection equipment;
        a third determination unit that determines whether there is the towed vehicle based on information from the vehicle rear monitoring equipment; and
        a pre-determination unit that determines whether there is a connection of the towed vehicle based on information from the trailer brake control connection detection equipment, in addition to the first determination unit and the third determination unit, and
    wherein, when the pre-determination unit determines that there is no connection of the towed vehicle, the towed vehicle presence determination unit determines that there is the connection of the towed vehicle when either one of a condition that the first determination unit determines that the total weight estimation value exceeds the threshold value and a condition that the second determination unit estimates that there is the towed vehicle is satisfied, and when the third determination unit determines that there is the towed vehicle.

2. The towed vehicle connection determination system according to claim 1, wherein the towed vehicle presence determination unit determines that there is a connection of the towed vehicle when either one of a condition that the first determination unit determines that the total weight estimation value exceeds the threshold value and a condition that the second determination unit estimates that there is the towed vehicle is satisfied, and when the third determination unit determines that there is the towed vehicle.

3. The towed vehicle connection determination system according to claim 1, wherein the towed vehicle presence determination unit determines that there is no connection of the towed vehicle when the third determination unit determines that there is no towed vehicle, even when either one of a condition that the first determination unit determines that the total weight estimation value exceeds the threshold value and a condition that the second determination unit estimates that there is the towed vehicle is satisfied.

4. The towed vehicle connection determination system according to claim 1, wherein
the towed vehicle presence determination unit determines that there is no connection of the towed vehicle when the pre-determination unit determines that there is no connection of the towed vehicle and when the third determination unit determines that there is no towed vehicle, even when either one of a condition that the first determination unit determines that the total weight estimation value exceeds the threshold value and a condition that the second determination unit estimates that there is the towed vehicle is satisfied.

5. The towed vehicle connection determination system according to claim 1, wherein the pre-determination unit determines that the towed vehicle is not connected based on information from the trailer brake control connection detection equipment, and, in response to the pre-determination unit determining that the towed vehicle is not connected, the towed vehicle presence determination unit determines that the towed vehicle is connected based on information from the weight estimation equipment or the peripheral detection equipment, and based on information from the rear monitor equipment.

* * * * *